Jan. 7, 1969 W. C. FRY 3,421,023
CONTROLLED RECTIFIER TRIGGER CIRCUIT COMPRISING SCR AND PLURAL
STORAGE MEANS FOR DISCHARGING THROUGH SCR AND MAINTAINING
CONDUCTION DURING POSITIVE ANODE VOLTAGE
Filed June 6, 1966
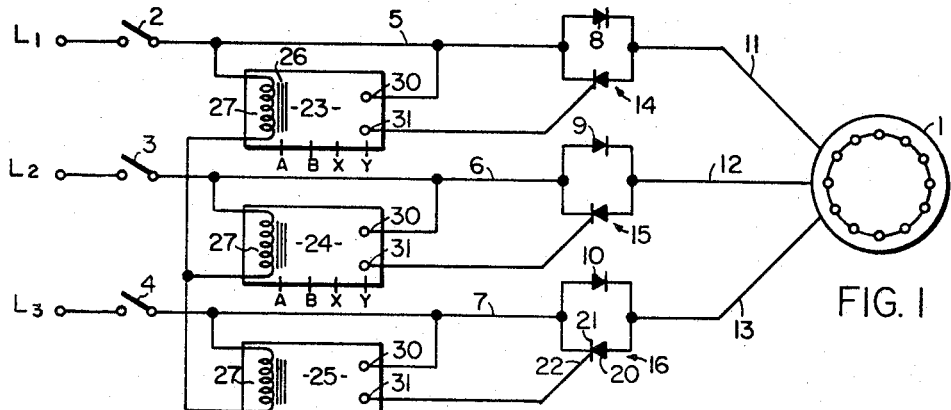
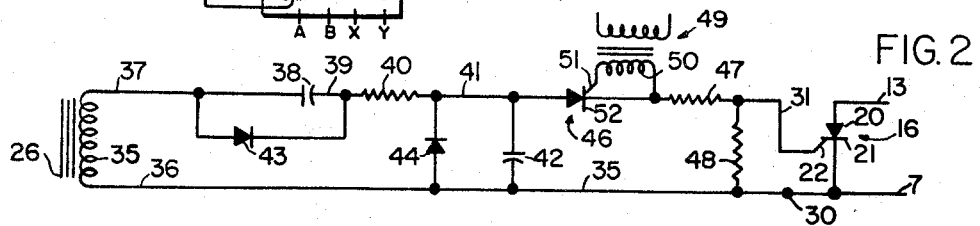
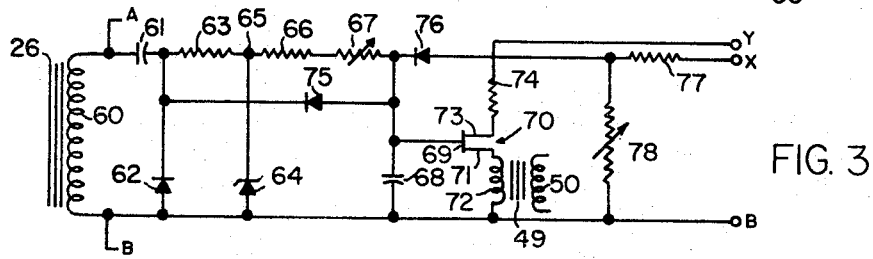
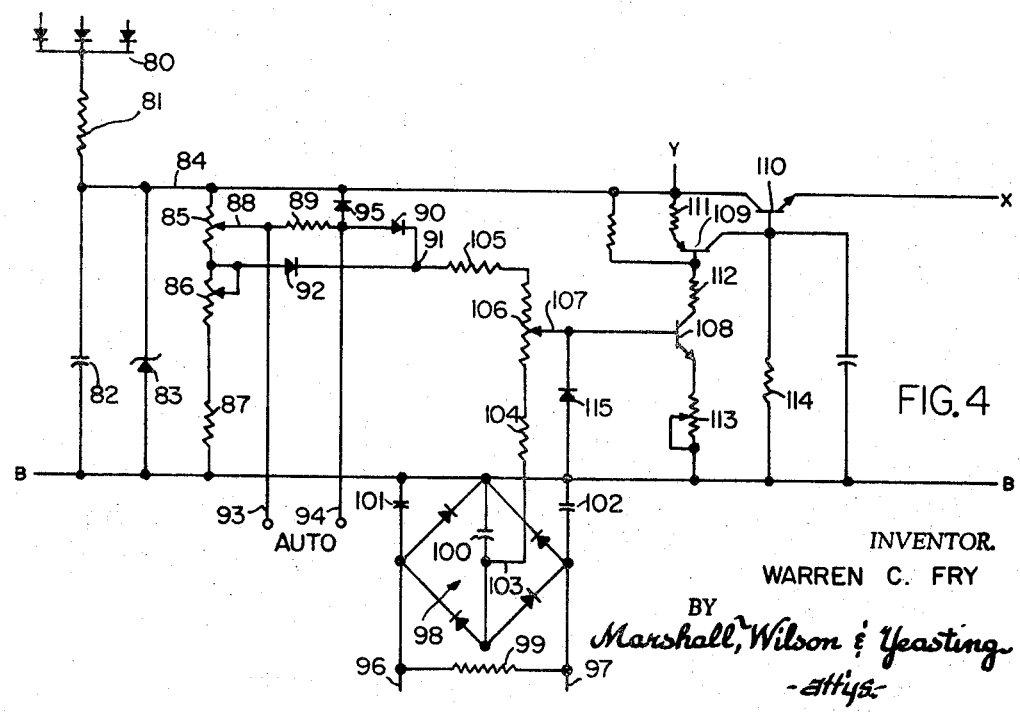
INVENTOR.
WARREN C. FRY
BY
Marshall, Wilson & Yeasting
-Attys.-

United States Patent Office 3,421,023
Patented Jan. 7, 1969

3,421,023
CONTROLLED RECTIFIER TRIGGER CIRCUIT COMPRISING SCR AND PLURAL STORAGE MEANS FOR DISCHARGING THROUGH SCR AND MAINTAINING CONDUCTION DURING POSITIVE ANODE VOLTAGE
Warren C. Fry, Connellsville, Pa., assignor to General Equipment and Manufacturing Company, Louisville, Ky., a corporation of Kentucky
Filed June 6, 1966, Ser. No. 555,381
U.S. Cl. 307—252
Int. Cl. H03k 17/60; 17/74
9 Claims This invention relates to electronic control circuits and in particular to an improved circuit for supplying control power to a silicon controlled rectifier or similar device.

When electrical devices such as silicon controlled rectifiers are used to control the flow of current to an inductive load energized from an alternating current power source, it is necessary to maintain current flow through the control electrodes for a substantial period of time until the current in the anode circuit becomes sufficient to maintain conduction. This problem is particularly troublesome when the rectifier is to be brought into conduction early in the alternating current cycle while the anode voltage is still low.

The principal object of this invention is to provide a control circuit for controlling a silicon controlled rectifier that delivers, in response to a pulse signal, an initial high current pulse and a continuing smaller control current sufficient to maintain conduction through the rectifier.

Another object of the invention is to provide a signal control circuit in which electrical energy is stored during the half cycle of the alternating current when the anode voltage of the rectifier is negative and which is supplied to such silicon controlled rectifier during such time as the rectifier is required to be conducting.

A still further object of the invention is to provide a control circuit that includes a first energy storage device that provides an initial surge of current of short duration to switch the controlled rectifier into conducting condition, that includes a second energy storage device to supply a low current pulse of substantial time duration, and means for continuing the flow of control current during such time as the anode of the rectifier is positive.

These and more specific objects and advantages are apparent from the following description of a preferred form of the invention.

According to the invention, means are provided which, during the half cycles when the anode voltage of the controlled rectifier is negative, charge a pair of condensers which, when it is desired to initiate conduction in the controlled rectifier, are discharged through the control circuit of the rectifier, the first condenser being connected through a low impedance to provide a high current surge to initiate conduction and the second condenser being connected through a larger resistance to provide a relatively long duration current pulse. Means are further provided to maintain the low current pulse during substantially the full time that the anode voltage of the rectifier is positive with respect to its cathode.

In a preferred form of the invention the condensers, which are charged during the negative half cycles, are connected to the gate circuit of a silicon controlled rectifier by way of a small silicon controlled rectifier the gate circuit of which is energized by a sharp pulse of current at the instant it is desired to initiate conduction in the silicon controlled rectifier to be controlled.

A preferred form of the invention is illustrated in the accompanying drawings.

In the drawings:

FIG. 1 is a schematic diagram of a motor control circuit employing the improved rectifier control circuits.

FIG. 2 is a wiring diagram of a control circuit according to the invention for supplying control current to a silicon controlled rectifier.

FIG. 3 is a circuit diagram of circuit means for delivering timed signal pulses to the control circuit of FIG. 2.

FIG. 4 is a circuit diagram of a control amplifier suitable for use for controlling the timing circuit shown in FIG. 3.

These specific figures and the accompanying description are intended merely to illustrate the invention and not to impose limitations on its scope.

The improved control circuits according to the invention are particularly well adapted for use with silicon controlled rectifiers employed to control the current flow through an inductive load. The improved circuits are also well adapted for use in situations where the controlled rectifiers are at the potential of the alternating current line rather than at ground potential inasmuch as the circuit itself may be completely insulated from ground and signals may be inductively coupled to it by means of small pulse transformers.

For purposes of illustration the improved circuit, as applied to a voltage control for an induction motor, is illustrated in the drawings.

In FIG. 1 a three phase induction motor 1 is illustrated as being energized from a three phase power line comprising leads L1, L2 and L3. In this arrangement power from the power line is fed through switches 2, 3 and 4 of a customary disconnect switch, which may include fuses or circuit breakers, through leads 5, 6 and 7 and rectifier cells 8, 9 and 10 connected through leads 11, 12 and 13 to the motor 1. The rectifier cells 8, 9 and 10 are connected to feed current in the conventional sense from leads L1, L2 and L3 to the motor 1. Return current from the motor is fed to the power line through silicon controlled rectifiers 14, 15 and 16 connected respectively in parallel with and oppositely poled to the rectifier cells 8, 9 and 10. The circuit as shown controls the current flow from the motor 1. The circuit is equally effective for controlling the current flow if the rectifier cells 8, 9 or 10 are interchanged with the corresponding silicon controlled rectifiers 14, 15 and 16 in which case the control rectifier would control the flow of current from the lines to the motor while the rectifier cells would freely pass the return current from the motor back to the line.

Each of the silicon controlled rectifiers, such as the rectifier 16, comprises an anode 20, a cathode electrode 21 and a gate electrode 22.

Each of the silicon controlled rectifiers 14, 15 and 16 is individually controlled by controls 23, 24 and 25 of FIG. 1 the details of which are shown in FIGS. 2 and 3. Each of these controls includes a power transformer 26 having a primary winding 27 which primary windings are connected in Y across the leads 5, 6 and 7 carrying the three phase power. Each of the controls 23, 24 and 25 has output terminals 30 and 31 one of which is connected to the power lead leading to the cathode of the controlled rectifier and the other of which is connected to the gate electrode of the rectifier. As shown in FIG. 1 the cathodes of the controlled rectifiers are connected to the power leads 5, 6 and 7. If the diodes 8, 9 or 10 are interchanged with the controlled rectifiers the output leads from the control circuits must still be connected between the cathodes of the controlled rectifiers and the gate electrodes regardless of whether the cathodes are connected to the leads 5, 6 and 7 or to the leads 11, 12 and 13.

FIG. 2 shows a preferred circuit for supplying control power for each of the silicon controlled rectifiers 14, 15 or 16 of FIG. 1. This circuit comprises a secondary winding 35 having leads 36 and 37. Lead 36 is connected directly to output terminal 30 and hence to the cathode electrode 21 of the silicon controlled rectifier to be controlled. Lead 37 is connected to a first terminal of a condenser 38 which is connected through a lead 39, a resistor 40, a lead 41, and a second condenser 42 connected to the return lead 36. A pair of rectifiers 43, 44 are also provided, the rectifier 43 being connected in parallel with the first condenser 38 and the rectifier 44 being connected in parallel with the second condenser 42. The rectifier 43 is arranged to pass current when the lead 37 is positive while the rectifier 44 is reversed so as to pass current when lead 37 is negative with respect to lead 36. The circuit can also be arranged with the rectifier 44 connected between the lead 36 and lead 39. This latter connection excludes the resistor 40 from the charging circuit of condenser 38. The illustrated arrangement is preferred because of the current limiting effect of the resistor 40 during the charging cycle.

The lead 41 is further connected through a controlled discharge device, preferably a small silicon controlled rectifier 46, and current limiting resistor 47 to the output terminal 31 connected to the gate electrode 22 of the rectifier to be controlled. A biasing resistor 48 connected between the output terminals 31 and 30 tends to hold these terminals at the same potential.

Signal current for triggering the small silicon controlled rectifier 46 into conduction is provided through a pulse transformer 49 having a secondary winding 50 connected between a gate electrode 51 and cathode 52 of the small controlled rectifier 46.

The transformer secondary winding 35 is connected so that the voltage on its lead 37 is in phase with the voltage on the anode of the silicon controlled rectifier to be controlled by this circuit. When so arranged the condenser 38 is charged during the half cycle of the alternating power when the lead 37 is negative with respect to lead 36. During this time the lead 41 is held at substantially the potential of the lead 36 or 30 (these being connected together) by current flow through the rectifier 44. As the voltage on the lead 37 becomes positive going, after its most negative maximum, a part of the charge accumulated on the condenser 38 is transferred through the resistor 40 to charge the condenser 42. Thus, by the time voltage on the anode of the controlled rectifier 16 approaches or becomes positive with respect to the cathode 21, in the positive going direction, the condenser 42 is charged to a substantial potential. At this point there is no current flow through the small controlled rectifier 46 to energize the gate electrode of the rectifier 16.

To initiate conduction in the rectifier 16 a voltage pulse is transmitted through the pulse transformer 49 to trigger the small controlled rectifier 46 into conduction thereby, in effect, connecting the condenser 42 through the current limiting resistor 47 across the terminals 31 and 30 connected respectively to the gate and cathode of the rectifier 16. The condenser 42 then discharges through this path supplying a gate current for the rectifier 16 limited only by the current limiting resistor 47. Preferably the current limiting resistor 47 has a value in the order of 10 ohms and the condenser 42 is charged to approximately 10 volts so that the initial current surge through the gate electrode of the rectifier 16 is in the order of an ampere. This high current flow lasts less than a microsecond depending upon the capacitance of the condenser 42. For a medium power rectifier, the condenser 42 may have a value of two-tenths of a microfarad so that this condenser is substantially discharged through the gate circuit in approximately a half of a microsecond. This provides the initial pulse of current for positively driving the controlled rectifier 16 into conduction. However, with inductive loading, anode current cannot build up to a sustaining value in this short time interval. The circuit meets this problem by providing that current may also flow from the condenser 38 through the current limiting resistor 40 and the resistor 47 so as to discharge the condenser 38 into the gate electrode circuit of the rectifier 16 at a slower rate. Preferably, the condenser 38 has a value in the order of 10 microfarads and the resistor 40 a value of approximately 150 ohms thus giving a time constant in the order of one and one half milliseconds which is thus able to supply current at a sufficient level to maintain conduction for two or three milliseconds of time. The current flow during this interval is limited primarily by the resistor 40 to a value well within the continuous current rating of the gate circuit of the rectifier.

When the lead 37 of the winding 35 goes positive with respect to lead 36 on the positive half cycle current may also flow through the rectifier 43 and resistor 40 to supplement the current from the condensers and maintain current flow through the gate circuit of the rectifier 16 for the balance of the positive half cycle of supply voltage.

This circuit thus provides energy storage means for supplying an initial high current surge to initiate conduction in the controlled rectifier, a further current flow at a reduced level from a source of stored energy for maintaining conduction in the controlled rectifier and, finally, means including the transformer secondary for continuing the flow of current throughout the remainder of the positive half cycle of the supply voltage.

FIG. 3 illustrates a timing circuit suitable for energizing the pulse transformer 49 and thus triggering the small controlled rectifier 46. This particular circuit provides that the timing of the pulse relative to the alternating current power may be continuously varied by means of an applied direct current signal voltage. As illustrated, this circuit is supplied with power from a secondary winding 60 of the transformer 26 having output terminals A and B. A condenser 61 and diode rectifier 62 are connected in series across the secondary winding terminals A and B, the rectifier 62 being arranged so that the condenser 61 is charged through the rectifier when the anode voltage of the rectifier to be controlled is negative. As the potential of the lead A rises from its most negative excursion value current flows from the condenser 61 through a resistor 63 and, as soon as the voltage is high enough, through a breakdown or Zener diode 64 to establish a positive regulated voltage at junction 65 between the resistor and the diode. The voltage at the junction 65 produces current flow through the resistor 66 and an adjustable resistor 67 in a direction to charge a timing condenser 68 connected between an emitter 69 of a unijunction transistor 70 and return lead B. The unijunction transistor 70 has a base 71 connected to the return lead B through a primary winding 72 of the pulse transformer 49. Its other base 73 is connected through a resistor 74 to a source of constant positive potential by way of terminal Y. The unijunction transistor 70 has the property that it is essentially a high resistance circuit between its bases 73 and 71 until its emitter rises to a specified potential, approximately one half, of the potential between the bases as the condenser 68 is charged through the resistors 66 and 67. When the critical potential is reached the unijunction transistor 70 becomes conducting and discharges the condenser 68 through its emitter to base 71 circuit and through the primary winding 72 of the transformer 49 thus generating a pulse of voltage to trigger the small silicon controlled rectifier 46 of FIG. 2.

To insure a constant repeatable condition from cycle to cycle the condenser 68 is completely discharged to the potential of the lead B each time the transformer terminal A goes negative by current flow through a diode 75 connected between the condenser 68 and the junction between the condenser 61 and rectifier 62. From this discharged condition at the start of each cycle the condenser 68 is charged at a rapid rate by way of a diode rectifier 76 and resistor 77 from a source of control potential applied across terminals X and B of FIG. 3. The condenser 68 is further charged by current flow through resistors 66 and 67 as soon as the voltage at the junction 65 exceeds the voltage on the condenser 68.

In the circuit of FIG. 1 it may be noted that similar control circuits are employed in each of the three power lines leading to the motor 1. It is desirable that the circuit remain balanced, i.e. each of the silicon controlled rectifiers 14, 15 and 16 be conductive for like intervals of time to minimize any accumulative rectifying action producing direct current in the motor windings. It is therefore highly desirable that each of the timing circuits, such as the one shown in FIG. 3, and which is duplicated in each of the controls 23, 24 and 25, be adjustable for trimming purposes so that they each produce the same timing as the others for a given input condition. Since the critical voltages of the unijunction transistors may vary slightly from unit to unit it is necessary that compensation be provided. This is done in the circuit of FIG. 3 by adding an adjustable resistor 78 to thus adjustably reduce the voltage applied through the rectifier 76 that furnishes the initial charging current for the condenser 68. Thus the magnitude of the initial charge may be adjusted to match the critical voltage of the corresponding unijunction transistor. This allows the several timing circuits to be adjusted for precisely equal time delays at the short timing intervals, i.e. when the initial charge thus applied to the condenser 68 supplies nearly enough voltage to trigger the transistor 70.

Circuit adjustment to secure tracking or equality of the timing intervals for the long time intervals is provided by the adjustable resistor 67 which varies the charging current to the condenser 68 and thus adjusts for differences in the Zener diodes 64 and differences in actual capacitance or time constant of the timing circuit comprising the resistors 66, 67 and condenser 68. Thus the adjustable resistor 67 may be considered a low speed or low current trim adjustment. The features of resetting the voltage on the condenser 68 to zero at the start of each timing cycle independently of the unijunction transistor 70, the feature of independent adjustment of the slow rate of charge of the condenser 68 by way of the resistor 67 and the independent adjustment of the potential furnishing the rapid rate of charge by way of the resistor 77 and diode 76 provide an extremely stable, readily adjusted or aligned set of timing circuits capable of precise adjustment, as is required when a plurality of silicon controlled rectifiers used in various phases of a power system must be balanced in operation.

While the circuits of FIGS. 2 and 3 are useful in any situation in which a silicon controlled rectifier is used to control a circuit having an inductive load, it is particularly well suited for control of the voltage applied to an induction motor such as for a speed control under light load duties. For this particular usage, it is desirable in some cases that the voltage control for the motor be speed sensitive, i.e. have speed signal feedback for improving the speed regulation of the motor. It is also desirable that the speed be controllable from the control signals issued by several types of commercial control equipment. Such equipment usually issues a control current ranging from 5 to 15 milliamperes. To satisfy these needs an amplifier circuit such as is shown in FIG. 4 may be employed.

This circuit comprises a three phase half wave rectifier including rectifier diodes 80 connected to terminal A of each of the transformers 26 such as shown in FIG. 3, the rectifier diodes being connected through a resistor 81 to charge a condenser 82 connected between the resistor 81 and return lead B. To regulate the voltage a Zener diode 83 is connected in parallel with the condenser 82 and thus maintains a constant positive voltage on lead 84 with respect to a common return lead B.

The remainder of the circuit of FIG. 4 comprises a comparison circuit for comparing a control voltage with a voltage developed by a speed responsive pickup cooperating with the motor 1 and a three stage transistor amplifier for amplifying the difference in voltage between the control and the speed voltage and supplying an amplified difference signal to therminal X for transmission to the terminals X, FIG. 3, of each of the control circuits.

The control voltage to be compared with the speed voltage is obtained from a resistive circuit comprising a potentiometer 85, a rheostat 86 and a fixed resistor 87 connected in series, in the order named, between the positive supply voltage line 84 and the return line B. The potentiometer 85 has a slider 88 that is connected through a resistor 89 and diode 90 to a junction 91 serving as the output of the control voltage determining portion of the circuit. The junction 91 is also connected through a second diode 92 to the junction between the potentiometer 85 and rheostat 86.

The control voltage may be modified or varied according to an electrical signal applied through leads 93 and 94 connected to the ends of the resistor 89. The electrical signal may be generated by process control equipment that issues a signal indicative of the speed at which the vibrator motor is to operate.

Because of the diode 92 the voltage, with respect to the return lead B, at the junction 91 cannot drop significantly below the voltage at the junction between the potentiometer 85 and rheostat 86. This voltage is adjusted by means of the rheostat 86. The maximum voltage at the junction 91, calling for highest operating speed, occurs when the slider 88 is moved to the high voltage end of the potentiometer 85 because, in the absence of any automatic signal, the voltage at the junction 91 is then fixed by current flow from the wiper 88 through the resistor 89 and diode 90. Intermediate values of control voltage at the junction 91 are obtained by adjustment of the potentiometer 85. On automatic control when a voltage is developed across the resistor 89 by the external control signal, the minimum speed is still fixed by the voltage at the junction between the rheostat 86 and potentiometer 85 since the externally applied signal is isolated by the diode 90 in the event the external signal calls for a lower speed. Thus if an increase in the external signals calls for a decrease in speed, the slider 88 is adjusted to the maximum desired speed and the external signal then flowing through the resistor 89 drops the voltage at the junction 91 to effect a decrease in speed. Conversely, if an increase in external signal is required to produce an increase in speed, the slider 88 is set at the minimum desired speed and the automatic signal raises the voltage transmitted through the diode 90 to the junction 91. A high speed limit may be imposed on the automatic signal by adding a diode 95 between the lead 94 and the supply voltage lead 84.

A voltage proportional to speed is used as a feedback voltage in the control system and this voltage may be obtained ffom any type of tachometer. Preferably, from a practical standpoint, the voltage may be generated in a coil located near one of the eccentric weights carried by the motors of a vibrator. The voltage is generated in the coil either by the motion of a magnet mounted on the eccentric weight or by providing a permanent magnet core or equivalent for the coil and mounting it in position so that the flux through the coil is varied by the iron counterweights moving past the coil. If such a coil and magnet arrangement is used, the output voltage comprises a positive going pulse and a negative going pulse each occurring once for each revolution of the motor. The output voltage of such a coil may be connected through leads 96 and 97 to opposite corners of a diode bridge rectifier 98. A loading resistor 99 may be connected between the leads 96 and 97. A condenser 100 connected across the other diagonal of the retcifier bridge circuit 98 is charged to a potential determined by the peak value of the pulses of voltage obtained from the tachometer generator. As shown, one terminal of the condenser 100 is tied to the return line B and a pair of relatively small condensers 101 and 102 are connected between the leads 96 and 97 and the return lead B to minimize the effect of stray electrical pickup in the leads from the tachometer generator.

This equipment provides a voltage proportional to speed across the condenser 100 and results in a negative voltage applied to a lead 103. This lead is connected through a pair of resistors 104 and 105 and a potentiometer 106 to the control voltage junction point 91. The voltage appearing at a slider 107 of the potentiometer 106 goes positive or negative with respect to the return line B depending uopn whether the oeprating speed of the motor is below or above the desired operating speed.

The voltage at the slider 107, with respect to the return lead B, is amplified by a three stage transistor amplifier comprising transistors 108, 109 and 110. In the amplifier, the principal current path is from the supply lead 84 through an emitter resistor 111 of the transistor 109, the emitter-base path of transistor 109, a resistor 112 connected from the base of transistor 109 to the collector of the transistor 108, through its collector-emitter path, and from its emitter through an emitter resistor or rheostat 113 connected to the return lead B. The current flow through this circuit is determied by the voltage of the slider 107 applied to the base of transistor 108. The current increases when the slider goes positive, which occurs when the control calls for a higher speed than is actually being developed. The increase in current flow through the emitter-base path of transistor 109 produces a corresponding increase in current flow through a collector load resistor 114 which raises the voltage on the base of the transistor 110 and thus raises the voltage on the lead X applied to the control circuits of FIG. 3. The rheostat 113 provides an easy method of controlling the voltage gain through the amplifier as may be required to secure stability of operation of the system.

As a safety precaution, diode 115 is connected between the slider 107 and the return line B to limit the application of negative voltage to the base of transistor 108.

In this circuit the potentiometer 106 serves, in part, as a gain or voltage control for the tachometer generator portion of the circuit because it determines how much of the control voltage is matched against the tachometer voltage.

Preferably, the comparison circuit comprising the resistors 104, 105 and the potentiometer 106 in combination with the condenser 100 has a time constant in the order of four or five seconds so as to limit the rate at which the voltage at the slider 107 can increase in the positive going direction to increase the application of power to the motor. The time constant of the charging circuit for the condenser 100 is very short so that power may be reduced very quickly when the correct speed of operation is reached.

The foregoing circuits, particularly those shown in FIGS. 2 and 3 provide means for accurately and reliably generating signal pulses at precisely maintained time intervals and for maintaining gate signal current through the controlled rectifiers to insure conduction through the rectifiers regardless of the characteristics of the load being energized through such rectifiers. These circuits further provide simple reliable means for readily adjusting the individual circuits to secure accurate tracking of the several circuits throughout the operating range.

Various modifications may be made in the specific circuits without departing from the spirit and scope of the invention.

Having described the invention, I claim:

1. A control circuit providing control current to a controlled rectifier having an anode, a control electrode, and a cathode, said control circuit comprising a first and a second energy storage means, means for charging said storage means during negative half cycles of supply power, circuit means including a controlled discharge device connecting said energy storage means to the control and cathode electrodes for discharging the storage means through said electrodes, means in said circuit means for limiting the discharge current of at least said second energy storage means, and means for supplementing said second storage means to continue current flow to said control and cathode electrodes during positive half cycle of the supply power, whereby said controlled rectifier may be held in conduction independently of its load characteristics.

2. A control circuit according to claim 1, in which the energy storage means comprise first and second condensers.

3. A control circuit according to claim 2 in which the condensers are serially connected in series with a current limiting resistor across a transformer winding supplying power to the circuit.

4. A control circuit according to claim 3 in which a unilateral conducting device is conneted in parallel with each condenser.

5. A control circuit according to claim 1 in which the controlled discharge device is a silicon controlled rectifier.

6. A control circuit according to claim 1 in which a current limiting resistor is included in the circuit from the second condenser to the controlled rectifier.

7. A control circuit according to claim 1 in which the unilateral conductive devices are arranged such that the first condenser is charged during the time that the anode voltage of the controlled rectifier is negative and discharges into the second condenser as said anode voltage becomes positive.

8. A control circuit according to claim 1 in which the first condenser has substantially more capacity than the second condenser.

9. A control circuit according to claim 1 in which the controlled discharge device includes a control element inductively energized from a signal source.

No references cited.

ARTHUR GAUSS, *Primary Examiner.*

S. D. MILLER, *Assistant Examiner.*

U.S. Cl. X.R.

307—246, 293, 305; 318—326